Figure 1:
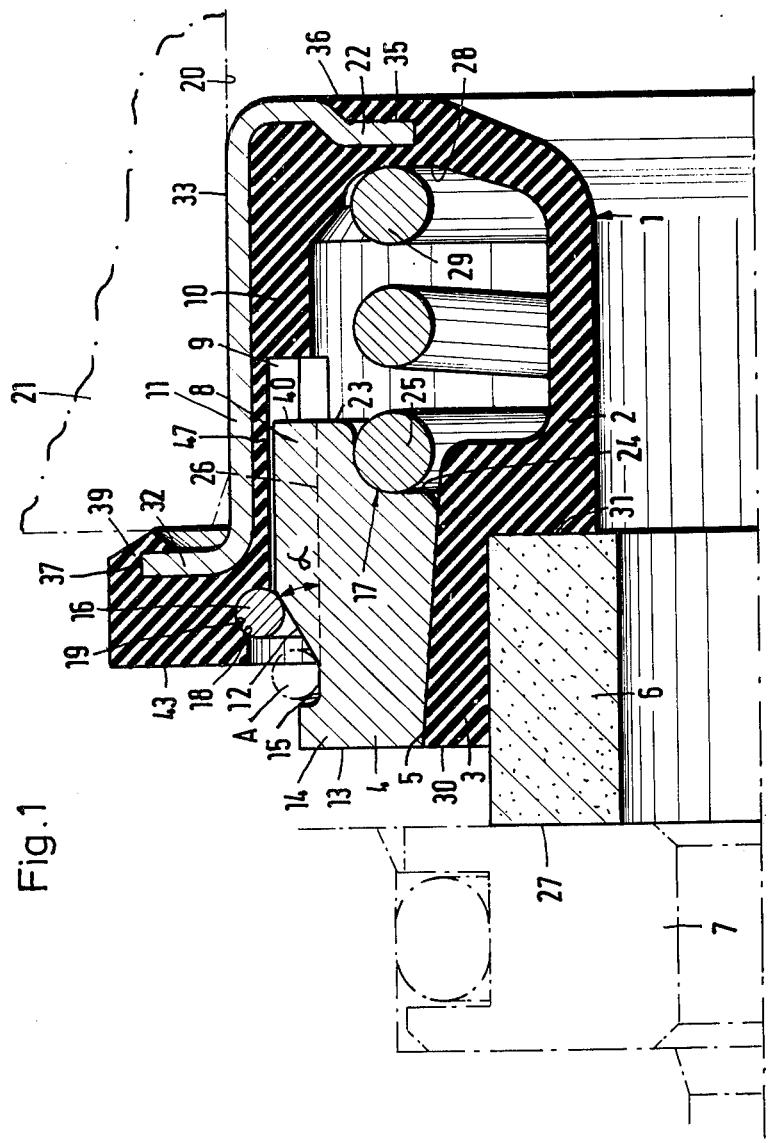

United States Patent [19]

Uhrner

[11] 4,124,219
[45] Nov. 7, 1978

[54] SLIDE RING SEAL

[75] Inventor: Klaus-Jürgen Uhrner, Leingarten, Fed. Rep. of Germany

[73] Assignee: Kupfer-Asbest-Co. Gustav Bach, Heilbronn, Fed. Rep. of Germany

[21] Appl. No.: 852,487

[22] Filed: Nov. 17, 1977

[30] Foreign Application Priority Data

Nov. 18, 1976 [DE] Fed. Rep. of Germany ....... 2652563

[51] Int. Cl.² ............................................. F16J 15/36
[52] U.S. Cl. ........................................ 277/40; 277/42; 277/82; 277/92
[58] Field of Search .................................. 277/38–43, 277/82, 86, 87, 92, 93 SD

[56] References Cited

U.S. PATENT DOCUMENTS

| 2,892,642 | 6/1959 | Payne | 277/42 |
| 2,899,219 | 8/1959 | Payne | 277/43 |
| 3,275,334 | 9/1966 | Voitik | 277/41 |
| 3,502,343 | 3/1970 | Pustelnik | 277/41 X |

FOREIGN PATENT DOCUMENTS

| 602,681 | 8/1960 | Canada | 277/40 |
| 647,038 | 8/1964 | Canada | 277/40 |

Primary Examiner—Robert S. Ward, Jr.
Attorney, Agent, or Firm—Walter Becker

[57] ABSTRACT

A slide ring seal structure for sealing machine elements rotatable about an axis, especially for sealing pump shafts, with an about rotation-symmetric housing which at one end face has a bottom extending transverse to the axis of the seal structure. The slide ring seal structure also has a primary seal designed as slide ring located in the interior chamber of the housing, and further has a bellows-shaped annular secondary seal as well as a spring arranged between the slide ring and the bottom of the housing. The secondary seal has an outer cone which flares in the direction of the sliding surface of the slide ring and has associated therewith a corresponding inner cone of a clamping member coaxially surrounding the secondary seal. The axial position of the clamping member relative to the slide ring and to the secondary seal being determined solely by the axial force exerted upon the clamping member during the installation of the slide ring seal structure.

17 Claims, 3 Drawing Figures

SLIDE RING SEAL

The present invention relates to a slide ring seal for sealing machine parts rotatable about an axis, especially for sealing pump shafts with a somewhat rotation symmetrical housing which at one end face thereof has a bottom extending transverse to the sealing axis, and which is provided with a primary seal located in the interior of the sealing housing and designed as slide ring, and which is furthermore provided with a bellows shaped annular secondary seal as well as with a spring arranged between said slide ring and said bottom.

In order to interconnect the primary and secondary seal in a medium tight manner, it is customary with slide ring seals of the above mentioned type to place the secondary seal by radially pressing its elastomeric material by means of a clamping member from the inner or outer side radially against the slide ring. The said clamping member may also simultaneously be designed as a spring dish.

With these known slide ring seals, the slide ring and the secondary seal as well as the clamping member are interconnected by an axially effective positive connection which latter is realized by radially directed annular shoulder surfaces on the cooperating parts namely slide ring, secondary seal and clamping member.

The relative position in axial direction, of the cooperating members namely slide ring secondary seal and clamping member, is determined by said positive connection. This means that even when in a manner known per se the cooperating mantle surfaces for manufacturing reasons are designed as conical connections, in view of the axially effective positive connection, the radial extrusion of the elastomeric material of the secondary seal between slide ring and clamping member is generated solely by the actual dimensions of the cooperating parts.

With some heretofore known designs of slide ring seals, this connecting area in addition to exerting its sealing function also has to transmit the friction moment occurring in operation between the sliding partners namely the slide ring and the counter running surface and has to introduce this friction moment into the clamping member so that in addition to closing the secondary leaking path in axial direction between the slide ring and the secondary seal, a certain minimum frictional connection has to be created in circumferential direction.

For assuring the tightness as well as for transmitting the friction moment, on one hand a minimum value of extrusion or compression of the radial transverse section of the secondary seal is required. On the other hand, for strength and manufacturing reasons, a maximum value of radial compression at the connecting area must not be exceeded. This means that the diameters cooperating at the connecting area and cross sections for securing the function of the seal have to be kept at correspondingly narrow limits, in other words have to be manufactured with very close tolerances.

The heretofore known seal designs, also have the drawbacks that in view of the positive connection between shoulders and undercut areas for the slide ring and the secondary seal, frequently complicated cross sections are obtained with the inherent danger of an increased scrap during the manufacture of said parts.

It is, therefore, an object of the present invention so to design a slide ring seal of the above mentioned type that an economical mass fabrication will be possible and that independently of deviations in the dimensions of cooperating parts namely slide ring secondary seal and clamping member, at their connecting area there will be assured a constant extrusion or compression over the entire manufacture of the secondary seal at the connecting area while at the same time the dimensional tolerances are increased and the structural design of the cooperating parts will be simplified.

These and other objects and advantages of the invention will appear more clearly from the following specification in connection with the accompanying drawings, in which:

FIG. 1 illustrates an axial section through one portion of a slide ring seal according to the invention which seal is arranged in a pump housing.

Figure 2:
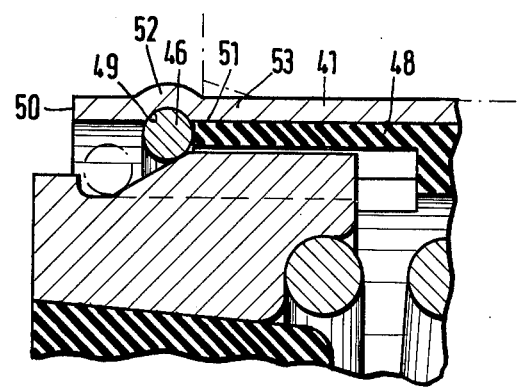
Figure 3:
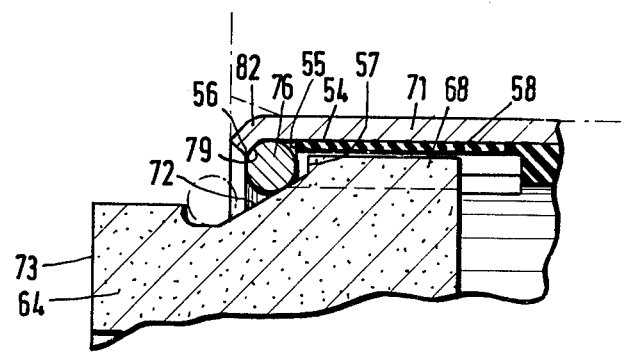

FIGS. 2 and 3 respectively illustrate portions of two further embodiments of a slide ring seal according to the invention.

The slide ring seal according to the present invention is characterized primarily in that the secondary seal has an outer cone which widens in the direction of the sliding surface of the slide ring and which has associated therewith a corresponding inner cone of a clamping member surrounding the secondary seal, while the axial position of said clamping member relative to the slide ring and to the secondary seal is determined solely by the axial force exerted upon the clamping member during the assembly of the slide ring seal.

In view of this design, the unfavorable deviations in dimensions of the members cooperating at the connecting area namely slide ring secondary seal and clamping member can be compensated for by forced limited tightening of the conical connection.

In this connection, it is particularly advantageous for an economical mass fabrication that in view of the independence from the respective actual dimensions of the cooperating members, which independence exists within the wide limits, it is possible to increase the measurement tolerances of said cooperating parts.

In view of the force limited assembly of the conical connection, the required radial compression of the secondary seal in the connecting area will be assured which radial compression is necessary to assure the tightness between slide ring and secondary seal, while on the other hand a too high compression of the secondary seal will be avoided which could otherwise bring about a deformation of the slide ring and produce an uneven sliding surface.

The compression spring which is arranged coaxially with regard to the secondary seal and which during the operation of the slide ring seal presses a slide ring axially against the counter running surface, has one end axially resting against a clamping member so that an accidental loosening of the conical connection will be safely prevented and a post-adjusting section will be exerted upon said connection.

A further advantage of the design according to the invention consists in that in view of its conically designed mantle surface, the secondary seal has in the region of connection only a slight undercut which, however, does not interfere with the removal of said secondary seal from the manufacturing tool, whereas the counter cone on the clamping member as lifting out inclination facilitates the removal of the clamping member from its form.

The present invention furthermore makes possible the employment of a sliding ring with a most simple cross section, preferably a rectangular-like cross section. The design of the slide ring in the form of a ring with rectangular cross section has the advantage that distortions during its manufacture and when in operation, as they may occur with rings having an uneven cross section over the circumference or over the axial extension will be avoided or reduced to a minimum. Moreover, such a ring of constant cross section can be obtained economically by cutting the ring off from a tubular semi finished member.

Referring now to the drawings in detail, FIG. 1 shows an axial slide ring seal according to the invention which comprises a housing 11, a slide ring 6 arranged in said housing, a secondary seal 1 which is designed as bellows and is located between the slide ring 6 and the housing bottom 22, and a spring 17 surrounding said bellows 1. Within the region below said slide ring 6, the bellows 1 merges through the intervention of a radially extending shoulder 2 with a widened axially extending section 3. The widened section 3 surrounds the slide ring 6 over nearly the entire radial width and over more than half its axial length. The section 3 of the bellows 1 widens conically in the direction toward the counter ring 7 which in operation engages the sliding surface 27 of the slide ring 6. The conical outer surface of section 3 of the bellows 1 engages an inner cone 5 of a clamping member 4 of the slide ring seal according to the invention, said clamping member 4 forming an abutment. The clamping member 4 extends in radial direction between the bellows 1 and the oppositely located wall 10 of the housing 11. The clamping member 4 has a cylindrical mantle surface 26 which axially projects beyond the inner conical surface 5 by about the cross sectional diameter of a spring winding. In assembled condition, the clamping member 4 forms with its end face 13 and the pertaining end surface 30 of bellows 1 a plane outer surface of the slide ring seal, said end face 13 being located within the region of the greater diameter of the inner cone.

The inner conical surface 5 of the clamping member 4 merges within the region of shoulder 2 of bellows 1 over a rounded section with an annular groove 24 which is positively engaged by one end 5 of spring 17. The other end 29 of spring 17 rests against a surface 28 which covers the housing bottom 22. The surface 28 is formed by a lining 10 of the housing 11. The lining 10 forms one piece with the bellows 1 of elastic material. The cylindrical outer surface 23 of the housing 11 merges through a rounded section with the housing bottom 22 which in the direction toward the slide ring 6 is offset axially inwardly and ends approximately within the region below the annular groove 24 of the clamping member 4. The bottom 22 is within the region of its offset end 35 surrounded by the lining in such a way that a plane bottom side 36 of the housing 11 is formed.

At the level of the end face 31 of slide ring 6 which end face 31 is located opposite the sliding surface 27, the housing 11 has a radially outwardly bent rim section 32 the radial outer end 37 of which is likewise surrounded by the lining 10. In assembled condition, the rim section 32 by means of an angularly shaped section 39 of lining 10 rests against a pump housing 21 and thus prevents the medium to be sealed from passing below the rim section 32.

The end face 13 of clamping member 4 which end face faces counter ring 7 is formed by cams 14 which radially project beyond the cylinder mantle surface 26 of clamping member 4 and are arranged in circumferential direction one behind the other. The cams 14 form an annular collar which serves as abutment for holding ring 16. Within the region below the cams 14, the clamping member 4 has axially extending webs 8 which project beyond the cylinder mantle surface 26 radially to a greater extent than to the cams 14. Over their entire radial width, the cams 18 are located in pertaining grooves 9 of the lining 10 of housing 11 and extend in radial direction over about half the length of the clamping member 4. With one end face 40 the webs 8 form a plane outer surface of the annular member within the region of the annular groove 24, and with their other end face 12 bevelled merge with the cylinder mantle surface 26 of the clamping member 4. The end face 12 defines with the cylinder mantle surface an angle $\alpha$ of about 30°. That section 15 of the cylinder mantle surface 26 which is located between the annular collar 14 and the webs 8 forms a recess for the holding ring 16. The cams 14 extend in circumferential direction substantially over the entire distance between webs 8 adjacent to each other in circumferential direction.

With about the height of its annular collar 14 and the height of the recess 15, the clamping member 4 projects beyond the top side of the lining 10 within the region of the rim section 32 of housing 11. In this way an insert opening for the holding ring 16 is formed. The holding ring 16 has a circular cross section. Its clear width is slightly less than the outer diameter of the recess 15 of the clamping member 4. The holding ring 16 may be designed as round wire spring ring of metallic or non-metallic material or may be designed as O-ring of elastic material. However, the holding ring 16 may also be formed by a helical tension spring closed so as to form a ring. At any rate, the holding ring must have elastic properties so that when being slipped onto the widened section 12 of the slide ring seal, which is formed by the inclined end faces of web 8, the holding ring is adapted to be radially widened or can slide back automatically along the inclined surface into the recess 15.

Furthermore, the holding ring 16 may consist of a water soluble material as for instance polyvinylalcohol. As a result thereof, the clamping member 4 can be designed particularly simple because in such an instance the annular collar 14 which is merely intended to prevent the holding ring 16 in its released position from slipping off the clamping member 4, will not be necessary.

The axial length of grooves 9 of the lining 10 corresponds about to the length of the radial outer confining surface 47 of web 8 plus the distance by which the spring 17 can be maximally compressed relative to its length which it occupies in the position in which a slide ring seal is mounted.

For purposes of arresting the clamping member 4 by means of the holding ring 16, the lining 10 of the housing 11 is within the region above the housing rim section 32 provided with an engaging recess 19 which, as shown in FIG. 1, has a pitch circle shaped cross section. In its arresting position, the holding ring 16 positively engages recess 19.

In order that the bellows 1, which is vulcanized in its intermediate assembly position, be kept free from tensions as far as possible during the arrangement of the slide ring seal in said position, the clamping member 4 which serves as abutment for the bellows 1, is arrested relative to the housing 11. To this end, first the clamping member 4 is against the thrust of pressure spring 17 pressed by a device (not shown) in the direction toward the housing bottom until the spacing of the upper confining edge 18 of recess 9, which edge faces the counter ring 7, from the oppositely located inclined surface 12 of the abutment is greater than the cross sectional diameter of the holding ring 16. Thereupon by means of a tool likewise not shown, the holding ring 16 located in the recess 15 of the clamping member is along the widened section 12 of the clamping member displaced until it engages the recess 19. In this connection the holding ring 16 is radially widened. After the removal of the tools or devices required for arresting the holding ring 16, the said ring is held in said recess 19 by the pressure spring 17. The holding ring 16 is pressed into said recess 19 all the more firmly and safely the higher the force exerted by spring 17. In this arresting position of the holding ring 16, the clamping member by means of its inclined surface 12 rests against the holding ring 16 so that the effective force is transmitted through the inner cone 5 onto the bellows 1 whereby the latter is held in its tension-free position. In view of the abutment, the bellows 1 can during the operation be held in the assembled condition of the axial slide ring seal, for instance in a pump housing, and during the mounting of the slide ring seal, substantially free from mechanical stresses whereby the duration of employment of the slide ring seal is greatly increased.

For disengaging the clamping member 4, the latter is pressed by a pressing-in tool (not shown) during the pressing in of the axial slide ring seal in the direction toward the housing bottom 22 into a receiving bore 20 of the pump housing 21 shown in dot-dash line in the drawing. This is effected against the thrust of the compression spring 17. At the same time, the clamping member 4 with its inclined surface 12 moves along the inner surface of the holding ring 16. In this connection the distance between the recess 19 and the pertaining inclined surface gradually increases. Accordingly, the holding ring 16 radially contracts in view of its elasticity. When the outer diameter of the holding ring 16 becomes less than the free diameter of the housing within the region of the edge 18 of said recess 19, the holding ring 16 slides along the inclined surface 12 out of the recess into its release position A, in which it is held by the annular collar 14 of the clamping member 4. In its release positon A, the abutment confinement or the clamping member 4 is released from the housing 11. In this position, the bellows 1 in view of the force of spring 17 occupies a maximum stretched position in which the bellows 1 and the spring 17 balance each other.

The embodiment shown in FIG. 2 of slide ring seal according to the invention differs from that of FIG. 1 merely in the design of the recess of the housing.

As shown in FIG. 2, the lining 28 of housing 41 ends in spaced relationship below the rim 50 of the cylindrical confining wall 53 of the housing. At the level of the free end 51 of lining 48, the housing wall 53 forms a bead 52 by means of which the housing 41 forms a recess 49 for the holding ring 46.

A further embodiment of a slide ring seal according to the invention is illustrated in FIG. 3. This embodiment differs from the slide ring seal of FIG. 1 in that an abutting confinement 64 is provided which forms one piece with the slide ring. The said abutment 64 forms with the slide ring a plane slide ring surface 73. Furthermore, this axial slide ring seal differs from the other embodiments also by the design of the recess 79 for the holding ring 76. The recess 79 is formed by rim 82 of housing 51 which rim is angled off toward the interior in an inclination to the longitudinal axis of the slide ring seal. According to FIG. 1, also in this instance a lining 54 is provided which ends in spaced relationship to and below the rim 82. The upper end 55 of said lining 54, which upper end faces the rim 82 is spaced from the axial inner confining edge 56 of end 55 by a distance corresponding approximately to the length of the cross sectional diameter of the holding ring 76. A further difference over the embodiments of FIGS. 1 and 2 consists in that the inclined surface 72 of the abutment is formed not exclusively by the webs 68 but by a major portion of its length by the abutment 64 itself. The inclined surface 72 merges in the region of the webs 68 over a radially extending shoulder surface 57 with the cylindrical confining surface 58 of web 68.

In the embodiment of FIG. 2, the clamping member 4 which with the other embodiments may consist either of metallic or nonmetallic material, consists of a material which is also suitable for s slide ring.

By means of the inner cone 5 of the abutment, the tight pressing-on force is obtained which is necessary between slide ring and that section 3 of bellows 1 which surrounds said slide ring, and the frictional moment which prevails during the operation between slide ring 6 and counter ring 7 is transmitted through webs 8 of the abutment into the sealing housing 11.

It is, of course, to be understood that the present invention is by no means limited to the specific showing in the drawings, but also comprises any modifications within the scope of the appended claims.

What I claim is:

1. A slide ring seal structure for sealing machine elements rotatable about an axis, especially for sealing pump shafts, which includes an about rotation-symmetric housing having a bottom extending transverse to the axis of said seal structure, a primary seal forming a slide ring with a sliding surface and being located in the interior of said housing, a bellows-shaped annular secondary seal a pre-loaded spring arranged between said bottom and said slide ring and continuously urging the latter away from said bottom, said secondary seal having a first conical surface flaring in the direction of said sliding surface of said slide ring, and a clamping member arranged in said housing and coaxially surrounding said secondary seal and having a second conical surface corresponding to said first conical surface and slidably engaging the latter.

2. A structure according to claim 1, in which said clamping member within the region of its smallest clear width is provided with an annular groove engaging one end of said spring.

3. A structure according to claim 2, in which said one end of said spring positively engages said groove.

4. A structure according to claim 1, in which said clamping member has a cylindrical outer surface and in circumferential direction thereof is provided with a plurality of axially extending webs arranged one behind the other in the circumferential direction of said clamping member, said webs radially projecting beyond said cylindrical outer surface, said housing having grooves associated with said webs.

5. A structure according to claim 1, in which said clamping member is formed by said slide ring.

6. A structure according to claim 4, in which the outer end faces of said webs are provided with a supporting surface inclined with regard to the longitudinal axis of said slide ring seal structure, and which includes a holding ring for cooperation with said inclined surfaces to hold said clamping member in engagement with said spring.

7. A structure according to claim 6, in which said inclined surface defines an angle of approximately 30° with the longitudinal axis of said slide ring seal structure.

8. A structure according to claim 6, in which said holding ring is movable selectively into a clamping member holding position and into a clamping member release position, and in which said clamping member has a shoulder-shaped recess located between said inclined surfaces and that end face of said clamping member which faces the sliding surface of said slide ring, said recess being adapted to receive said holding ring in said clamping member release position.

9. A structure according to claim 8, in which said clamping member has a cylindrical mantle surface and an annular collar which together form said shoulder-shaped recess, and in which the clear width of said holding ring is slightly less than the outer diameter of said cylindrical mantle surface of said clamping member.

10. A structure according to claim 9, in which said annular collar is formed by cam-shaped sections of said clamping member, and in which said cam-shaped sections within the region between adjacent webs extend in circumferential direction of said clamping member substantially over the entire distance between adjacent webs.

11. A structure according to claim 8, in which said housing has an arresting recess, and in which said holding ring when occupying its holding position engages said arresting recess.

12. A structure according to claim 11, in which said arresting recess is formed by a bed in said housing.

13. A structure according to claim 11, in which said arresting recess is formed by an inwardly directed rim section of the housing, said rim section being radially inclined to the longitudinal axis of said structure.

14. A structure according to claim 11, in which said housing includes a lining, and in which said arresting recess is provided in said lining.

15. A structure according to claim 8, in which the outer diameter of said holding ring in its holding position is less than the clear width of the arresting recess within the region of its axial outer confining edge facing said collar of said clamping member.

16. A slide ring seal structure for sealing machine elements rotatable about an axis, especially for sealing pump shafts, which includes an about rotation-symmetric housing having a bottom extending transverse to the axis of said seal structure, a primary seal forming a slide ring with a sliding surface and being located in the interior of said housing, a bellows-shaped annular secondary seal, a preloaded spring arranged between said bottom and said slide ring and continuously urging the latter away from said bottom, said secondary seal having a first conical surface flaring in the direction of said sliding surface of said slide ring, and a clamping member arranged in said housing and coaxially surrounding said secondary seal and having a second conical surface corresponding to said first conical surface and slidably engaging the latter, a holding ring being movable selectively into a clamping member holding position and into a clamping member release position, said clamping member having a shoulder-shaped recess located between said inclined surface and that end face of said clamping member which faces the sliding surface of said slide ring, said recess being adapted to receive said holding ring in said clamping member release position, and in which said secondary seal is vulcanized in a position corresponding to its intermediate installed position and in non-clamping position of said holding member is held in said last mentioned installed position by a disengageable abutment located between said housing and said secondary seal.

17. A structure according to claim 16, in which said abutment is formed by said clamping member, said clamping member being held in a self-locking member on said secondary seal.

* * * * *